(12) United States Patent
Komazawa

(10) Patent No.: US 12,223,375 B2
(45) Date of Patent: Feb. 11, 2025

(54) INFORMATION PROCESSING APPARATUS, PRINT SYSTEM, AND NON-TRANSITORY COMPUTER READABLE MEDIUM FOR MAINTAINING ORDER OF EJECTION OF PRINTED RECORDING MEDIUM

(71) Applicant: FUJIFILM Business Innovation Corp., Tokyo (JP)

(72) Inventor: Hisao Komazawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 394 days.

(21) Appl. No.: 17/567,152

(22) Filed: Jan. 2, 2022

(65) Prior Publication Data

US 2023/0035293 A1   Feb. 2, 2023

(30) Foreign Application Priority Data

Aug. 2, 2021   (JP) ................................. 2021-126805

(51) Int. Cl.
  *G06K 15/02*   (2006.01)
  *G06F 3/12*    (2006.01)

(52) U.S. Cl.
  CPC ....... *G06K 15/1836* (2013.01); *G06F 3/1204* (2013.01); *G06F 3/124* (2013.01); *G06F 3/1268* (2013.01); *G06F 3/1281* (2013.01); *G06K 15/1809* (2013.01)

(58) Field of Classification Search
  CPC ............ G06K 15/1836; G06K 15/1809; G06F 3/1204; G06F 3/124; G06F 3/1268; G06F 3/1281

USPC .................................................. 358/1.1–1.15
See application file for complete search history.

(56) References Cited

U.S. PATENT DOCUMENTS

| | | | |
|---|---|---|---|
| 2002/0021902 A1* | 2/2002 | Hosoda .............. | H04N 1/00965 396/429 |
| 2009/0059286 A1* | 3/2009 | Yamaguchi .............. | H04N 1/32 358/1.15 |
| 2013/0141750 A1 | 6/2013 | Suzuki | |
| 2021/0124297 A1* | 4/2021 | Agehama ........... | G03G 15/6552 |

FOREIGN PATENT DOCUMENTS

JP          2013114246       6/2013

* cited by examiner

*Primary Examiner* — Gabriel I Garcia
(74) *Attorney, Agent, or Firm* — JCIPRNET

(57) ABSTRACT

An information processing apparatus includes a processor configured to: receive a print instruction to print an image rasterized by another information processing apparatus; associate the print instruction with any one of plural ejection destinations to which a recording medium printed in response to the print instruction is ejected; and, in a case where the ejection destination associated with the print instruction waits for ejection of a recording medium subsequent to the already ejected recording medium, execute a print instruction for the subsequent recording medium, and not execute a print instruction for ejecting a recording medium other than the subsequent recording medium to the ejection destination.

13 Claims, 9 Drawing Sheets

FIG. 4
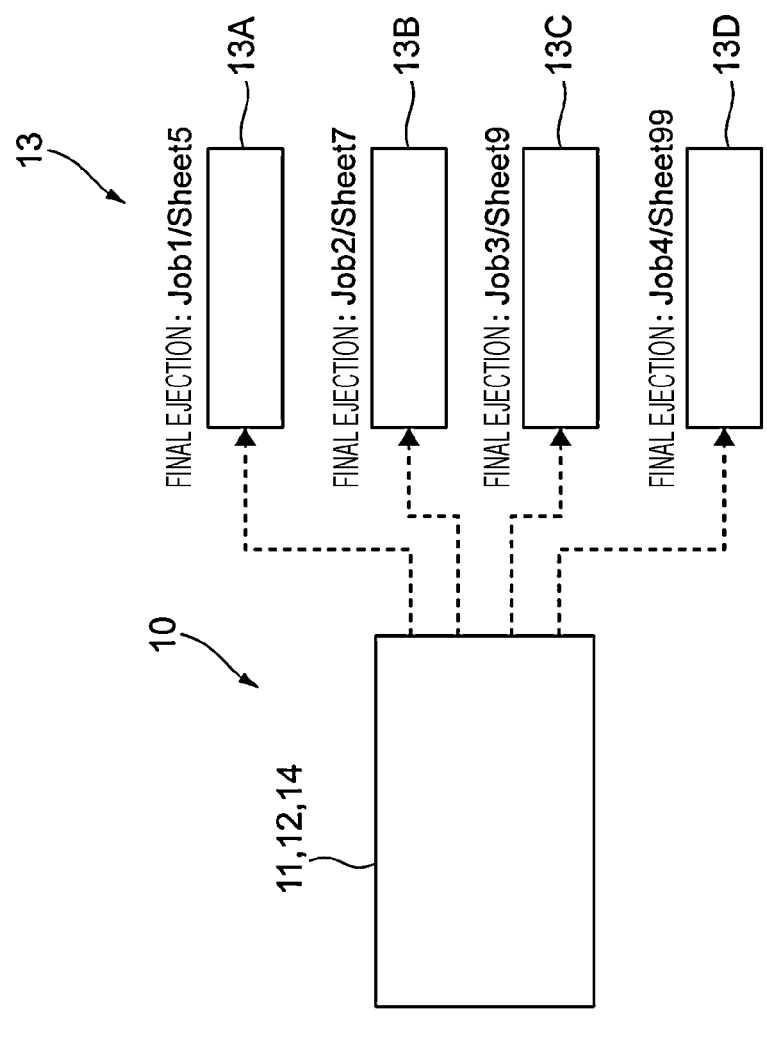
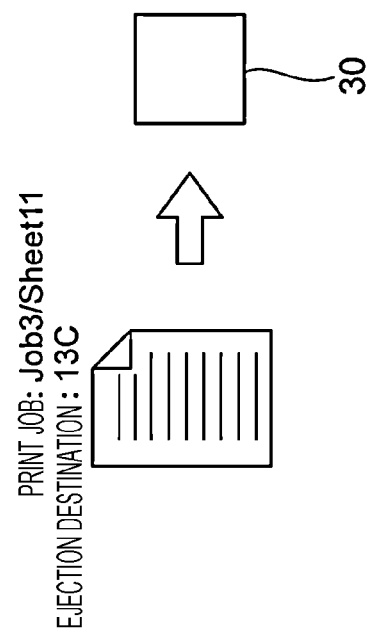

INFORMATION PROCESSING APPARATUS, PRINT SYSTEM, AND NON-TRANSITORY COMPUTER READABLE MEDIUM FOR MAINTAINING ORDER OF EJECTION OF PRINTED RECORDING MEDIUM

CROSS-REFERENCE TO RELATED APPLICATIONS

This application is based on and claims priority under 35 USC 119 from Japanese Patent Application No. 2021-126805 filed Aug. 2, 2021.

BACKGROUND

(i) Technical Field

The present disclosure relates to an information processing apparatus, a print system, and a non-transitory computer readable medium.

(ii) Related Art

Japanese Unexamined Patent Application Publication No. 2013-114246, for example, discloses a sheet processing apparatus including an inspection unit, a first ejection unit, a second ejection unit, and a first controller. The inspection unit reads and inspects an image formed on print output paper conveyed from an image forming apparatus. The first ejection unit is capable of sorting and ejecting print output paper determined based on the inspection done by the inspection unit as having been normally printed by the image forming apparatus to a plurality of output trays. The second ejection unit ejects print output paper determined based on the inspection done by the inspection unit as requiring reprinting by the image forming apparatus to an ejection part provided upstream of the first ejection unit. In accordance with the result of inspection done by the inspection unit of each page of print output paper, every time it is determined that any page of a plurality of pages requires reprinting, the first controller causes print output paper determined as requiring reprinting to be ejected to the ejection part, and, every time it is determined that any page of a plurality of pages requires reprinting, the first controller switches an ejection destination of a subsequent page of print output paper determined as having been normally printed after the page determined as requiring reprinting to an output tray different from an output tray of the first ejection unit that has ejected print output paper determined as having been normally printed before the page determined as requiring reprinting, and causes the subsequent page of print output paper to be ejected.

Here, the mode of printing, using an image forming apparatus, images rasterized by another information processing apparatus is considered. In this mode, in the case where images are rasterized by another information processing apparatus and these rasterized images are sequentially sent to be printed in the order of reception, it is assumed that the order of ejection of the printed pieces of a recording medium is not maintained, which may cause inconvenience such as difficulty in smoothly performing post-processing steps.

SUMMARY

Aspects of non-limiting embodiments of the present disclosure relate to maintaining the order of ejection of pieces of a recording medium ejected after rasterized images from another information processing apparatus are printed thereon.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing apparatus including a processor configured to: receive a print instruction that instructs the processor to print an image rasterized by another information processing apparatus; associate the print instruction with any one of a plurality of ejection destinations to which a recording medium printed in response to the print instruction is ejected; and, in a case where the ejection destination associated with the print instruction waits for ejection of a recording medium subsequent to the already ejected recording medium, execute a print instruction for the subsequent recording medium, and not execute a print instruction for ejecting a recording medium other than the subsequent recording medium to the ejection destination.

BRIEF DESCRIPTION OF THE DRAWINGS

An exemplary embodiment of the present disclosure will be described in detail based on the following figures, wherein:

FIG. 4 is a diagram describing a second example as exemplary processing in the case where a page print job is received;

DETAILED DESCRIPTION

Hereinafter, an exemplary embodiment of the present disclosure will be described in detail with reference to the attached drawings.

Figure 1:
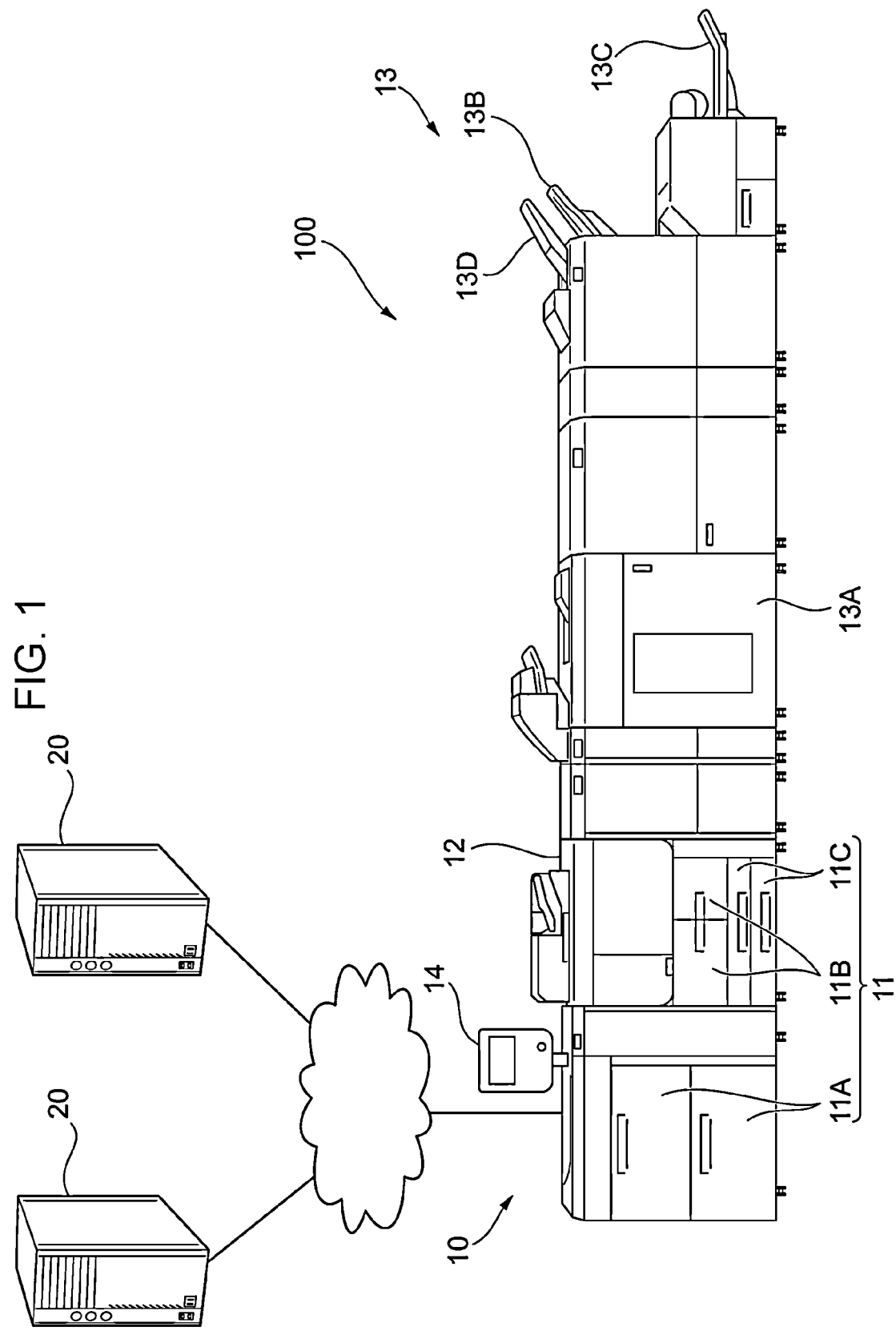
FIG. 1 is a diagram describing the configuration of a print system.

FIG. 1 is a diagram describing the configuration of a print system 100.

The print system 100 illustrated in FIG. 1 includes a printer 10 for printing on paper. The printer 10 is connected to each of server apparatuses 20 to be able to communicate with each other.

A network connecting the printer 10 and the server apparatus 20 employs, for example, a local area network (LAN) or the Internet. Needless to say, the network may be a composite type including a LAN and the Internet.

On the basis of an obtained print job, the printer 10 prints an image on paper, which is an example of a recording medium. The print job mentioned here refers to a processing unit of a print operation indicated by a single print instruction, and is an example of a print instruction. The printer 10 is an example of an image forming apparatus.

The printer 10 is, for example, a production printer used for commercial printing, and has a function capable of executing high-quality and high-speed printing. In addition, the printer 10 has a function capable of executing post-processing in accordance with a print instruction on paper on which an image has been printed. The post-processing mentioned here includes, for example, a process of binding a bundle of paper, a process of folding paper, a process of cutting paper, and a process of binding a book.

Note that the printer 10 is not limited to a production printer, and is applicable to a general printer (such as a business printer or a home printer).

The printer 10 includes the following: a paper feeding unit 11, which feeds paper to be printed; a printing unit 12, which prints on paper from the paper feeding unit 11; a plurality of ejection destinations 13, to which the printed paper is ejected; and an operation display 14 for the user.

The paper feeding unit 11 includes paper feeding trays 11A, 11B, and 11C for feeding paper. The paper feeding trays 11A to 11C are each capable of feeding paper of different sizes or of the same size.

The printing unit 12 may use, for example, besides electrophotography which forms an image by transferring toner adhered to a charged-and-exposed photoconductor to a recording material and fixing the transferred toner, inkjet printing which forms an image by discharging ink on a recording material.

The printing unit 12 is configured to be capable of executing double-sided printing on both sides of paper.

In the present exemplary embodiment, the ejection destinations 13 include a stacker tray 13A, a finisher tray 13B, a finisher ejection tray 13C, and an ejection tray 13D. In response to a print instruction, the conveyance route of printed paper is changed by a drive source to any one of the trays 13A to 13D (hereinafter may be referred to as the ejection destinations 13 or the ejection destinations 13A to 13D), and continuous printing is performed. The conveyance route of paper is formed by conveyance rolls, guide plate, and so forth (not illustrated). The ejection destinations 13A to 13D are one example of ejection destinations.

In each of the trays 13A to 13D, a detector (not illustrated) is arranged to detect removal of an ejected recording medium. With the detector, the printing unit 12 may detect a change in the state of the trays 13A to 13D.

The stacker tray 13A includes a stacker cart with wheels and a push handle. In response to ejection of paper directly to the pallet of the stacker cart, a large amount of ejected paper, such as 10,000 sheets, may be transported using the stacker cart without replacing the paper.

The finisher tray 13B includes a mechanism for performing binding, and is capable of binding the ejected paper. The finisher ejection tray 13C includes a mechanism for performing binding and folding, and is capable of folding and saddle-stitching the ejected paper. The ejection tray 13D is an ejection destination for small-volume printing.

The operation display 14 includes a display that displays various images for operation and various types of information to be reported to the user, and an input unit where various buttons are arranged for inputting information in accordance with an operation image on the display. Alternatively, the operation display 14 may be configured in such a manner that a touchscreen serves as a display screen, and the touchscreen may have the functions of a display and an input unit.

The printer 10 according to the present exemplary embodiment has, in addition to the function of printing an image on paper, the function of optically reading an image of a document or the like, and the function of feeding a document one sheet at a time to a reading area. The listed functions of the printer 10 are merely exemplary, and other functions are not precluded.

The server apparatus 20 may physically be a single computer, or may be realized by distributed processing of multiple computers. Although the server apparatus 20 is configured as a shared server that provides so-called cloud services in the present exemplary embodiment, the server apparatus 20 may be an on-premises server. The server apparatus 20 is an example of another information processing apparatus.

On receipt of a print instruction, the server apparatus 20 performs rasterization of image data included in the print instruction. A rasterized image, which is an image whose rasterization has been completed, is transferred to the printer 10. Note that the server apparatus 20 may sometimes perform rasterization after imposition in accordance with the print instruction.

Here, the server apparatus 20, which performs rasterization, may sometimes perform distributed processing of a single print job with an emphasis on productivity. In such a case of performing distributed processing, sheets of paper on which rasterized images have been printed are ejected to any one of the ejection destinations 13A to 13D. That is, the printed sheets of paper are ejected to the same ejection destination if they are of the same print job.

However, in such distributed processing, a single print job is separated into multiple portions to be rasterized by the server apparatus 20, and the results are separately transferred as data of rasterized images to the printer 10. Therefore, the distributed processing may cause circumstances where the order of ejection of the printed sheets of paper is not maintained.

To prevent such circumstances, for example, if the memory capacity of the printer 10 is large, data of the rasterized images is temporarily accumulated in the memory, and, after data of all the rasterized images of the same print job is obtained, printing is started, thereby maintaining the order of ejection of the printed sheets of paper. However, in the case of accumulating data in the memory as above, the printing speed of the printer 10 may become slower.

In addition, in the case where the memory capacity is only sufficient to store data of rasterized images of merely two pages or so in order to reduce the cost of the printer 10, if the amount of data of the rasterized images is large, this situation may not be coped with by accumulating data in the memory. Therefore, the printer 10 performs printing in the order of reception of data of the rasterized images, and the order of ejection may not be maintained.

Therefore, in the present exemplary embodiment, even in the case where the memory capacity of the printer 10 is made small, the configuration capable of maintaining the order of ejection of the printed sheets of paper while suppressing a decrease in processing speed is provided. This will be described as follows.

Figure 2:
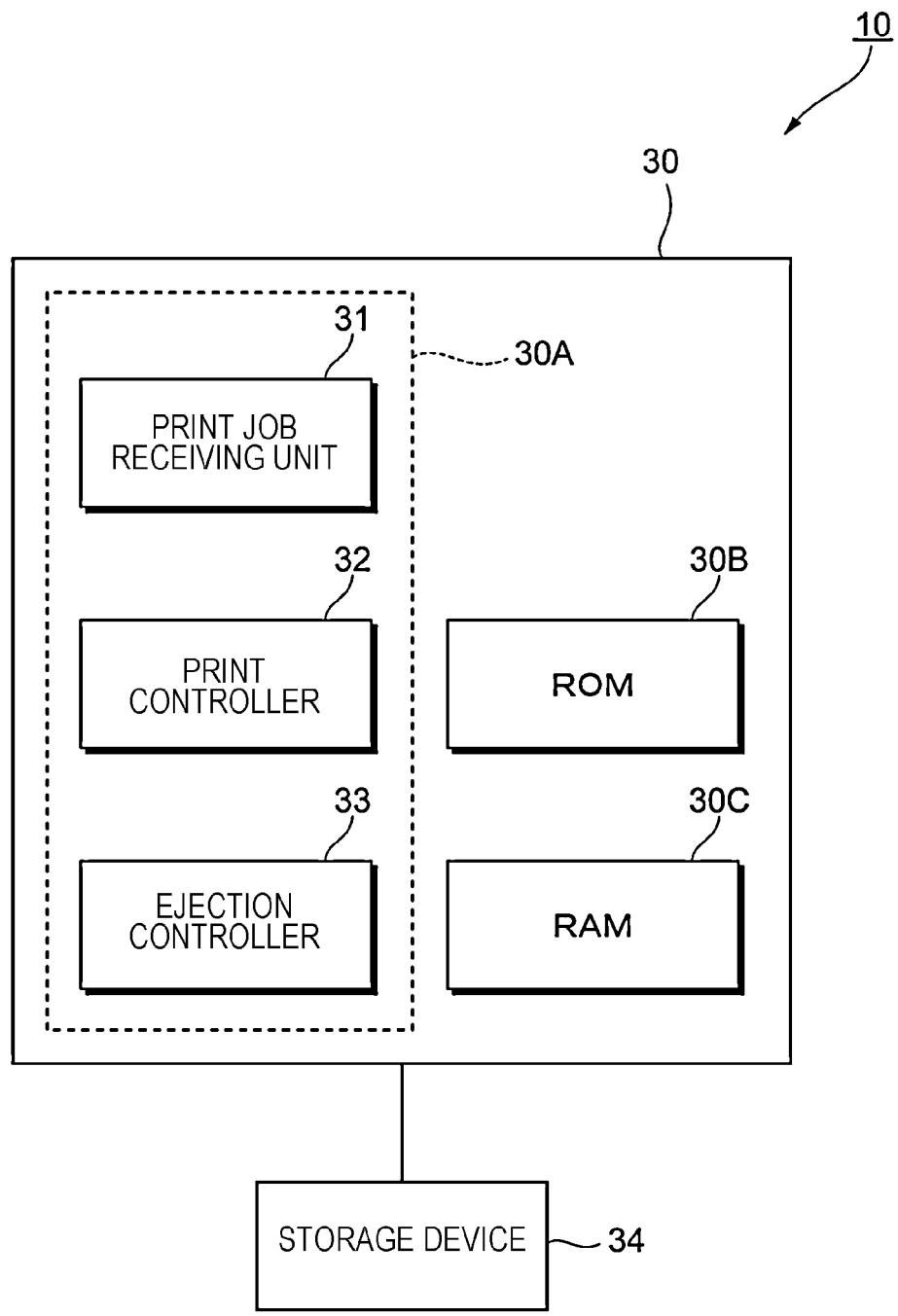
FIG. 2 is a functional block diagram of a printer.

FIG. 2 is a functional block diagram of the printer 10.

As illustrated in FIG. 2, the printer 10 includes a controller 30 including the following: a print job receiving unit 31, which receives a print job from the server apparatus 20; a print controller 32, which controls the above-mentioned printing unit 12; and an ejection controller 33, which controls ejection of paper in response to the print job. The controller 30 is connected to a storage device 34, such as a hard disk drive (HDD) provided outside. Note that the configuration having no storage device 34 is also adoptable.

The controller 30 is an example of an information processing apparatus; the print job receiving unit 31 is an example of a receiving unit; the print controller 32 is an example of a processor; and the ejection controller 33 is an example of an association unit. The printing unit 12 is an example of an image forming unit. The storage device 34 is an example of an external storage device.

Although the configuration of the print system 100 according to the present exemplary embodiment includes the printer 10 having the built-in controller 30, this is not the only possible configuration. For example, the configuration of the print system 100 may be such that the controller 30, which is an external device, is connected upstream to the printer 10, and the print system 100 includes the printer 10 and the controller 30. Alternatively, the configuration of the print system 100 may include the controller 30, which is an external device connected to the printer 10, but include no printer 10.

The print job receiving unit 31 of the controller 30 receives a print job including data of the rasterized images sent from the server apparatus 20, and reports a page print job based on the print job to the print controller 32.

The page print job is for executing all or some of the pages to be printed by the print job. Besides the case where a page print job serves as a print job, multiple page print jobs may correspond to one print job.

A page print job includes print job identification information for identifying a print job, and page identification information for identifying a page.

The print job identification information may be included in a print job from the server apparatus 20, or may be given by the print job receiving unit 31 for a received print job. The print job identification information in the latter case may include, for example, the server apparatus 20, which has sent the received print job, and the reception time.

Although a print job is associated with an ejection destination 13 using print job identification information for identifying the print job in the present exemplary embodiment, this is not the only possible case, and information capable of associating a print job and an ejection destination 13 may be used.

Page identification information is information for identifying a page number indicating which page of paper is to be printed by the page print job. Alternatively, page identification information may be sheet-number identification information for identifying a sheet number indicating which sheet of paper is to be printed by the page print job. In doing so, not only single-sided printing but also double-sided printing may be handled.

By calculating the difference between a page number identified by page identification information or a sheet number identified by sheet-number identification information and the total number of pages or the total number of sheets, whether the paper printed by a print job has been entirely ejected may be detected. In other words, whether each of the ejection destinations 13A to 13D is in the state of waiting for ejection of a subsequent recording medium may be determined.

The subsequent recording medium mentioned here refers to the next page of a recording medium of the most-recently-ejected recording medium in the case where a recording medium in response to a print job has not been entirely ejected. In the case of a recording medium printed in the form where a single piece of a recording medium includes multiple pages, the subsequent recording medium mentioned here refers to a recording medium including a page number subsequent to the largest page number included in the most-recently-ejected recording medium.

Instead of calculating the difference as described above, the mode in which the print controller 32 reports to the ejection controller 33 a signal indicating the final page to, among the ejection destinations 13A to 13D, an ejection destination to which the final page is ejected may be adopted. The ejection controller 33 is able to detect that paper printed in response to the print job has been entirely ejected to the ejection destination that has received the signal, and a later-described clearing process is performed.

In response to a page print job from the print job receiving unit 31, the print controller 32 allows the ejection controller 33 to determine whether ejection is possible, which is checking whether it is possible to eject paper to an ejection destination corresponding to the page print job. When it is reported from the ejection controller 33 that ejection is possible, the print controller 32 sends the page print job to the printing unit 12 (see FIG. 1).

In response to setting of a setting value for the print job on the operation display 14 (see FIG. 1), the ejection controller 33 obtains the setting value. The setting value will be described later using FIG. 6.

In addition, in response to a request from the print controller 32 for checking whether ejection is possible, the ejection controller 33 sends the state of a corresponding ejection destination to the print controller 32.

In addition, when the printing unit 12 detects a change in the state of the ejection destinations 13A to 13D, the ejection controller 33 receives a report thereof.

Here, the functions of the controller 30 are realized by a central processing unit (CPU) 30A, which is an example of a processor. The CPU 30A reads a program stored in read-only memory (ROM) 30B, and executes the program using random-access memory (RAM) 30C as a work area. The program executed by the CPU 30A may be provided to the printer 10 while being stored in a computer-readable recording medium such as a magnetic recording medium (magnetic tape, magnetic disk, etc.), optical recording medium (optical disk, etc.), magneto-optical recording medium, or semiconductor memory. Alternatively, the program executed by the CPU 30A may be downloaded to the printer 10 using means of communications such as the Internet.

Although the configuration in which the controller 30 of the printer 10 includes the print job receiving unit 31, the print controller 32, and the ejection controller 33 is adopted in the present exemplary embodiment, this is not the only possible configuration. The configuration in which another apparatus connected to the printer 10 includes the controller 30 may be adopted, or the configuration in which the controller 30 is a single separate device may be adopted.

Although the functions of the controller 30 are realized by software in the present exemplary embodiment, this is not the only possible case, and the functions may be realized by an application specific integrated circuit (ASIC).

Next, exemplary processing in the case where a page print job is received will be described using FIGS. 3 to 5.

Figure 3:
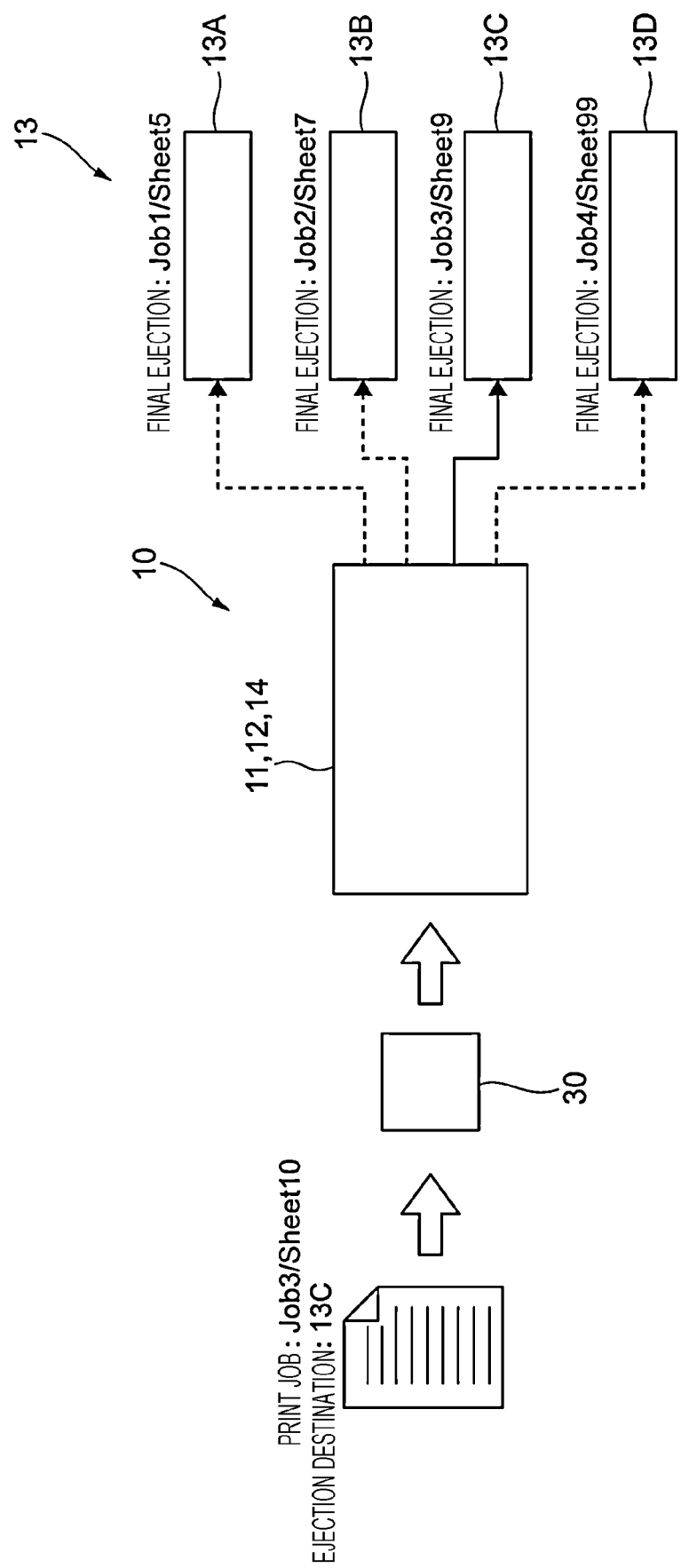
FIG. 3 is a diagram describing a first example as exemplary processing in the case where a page print job is received.
Figure 5:
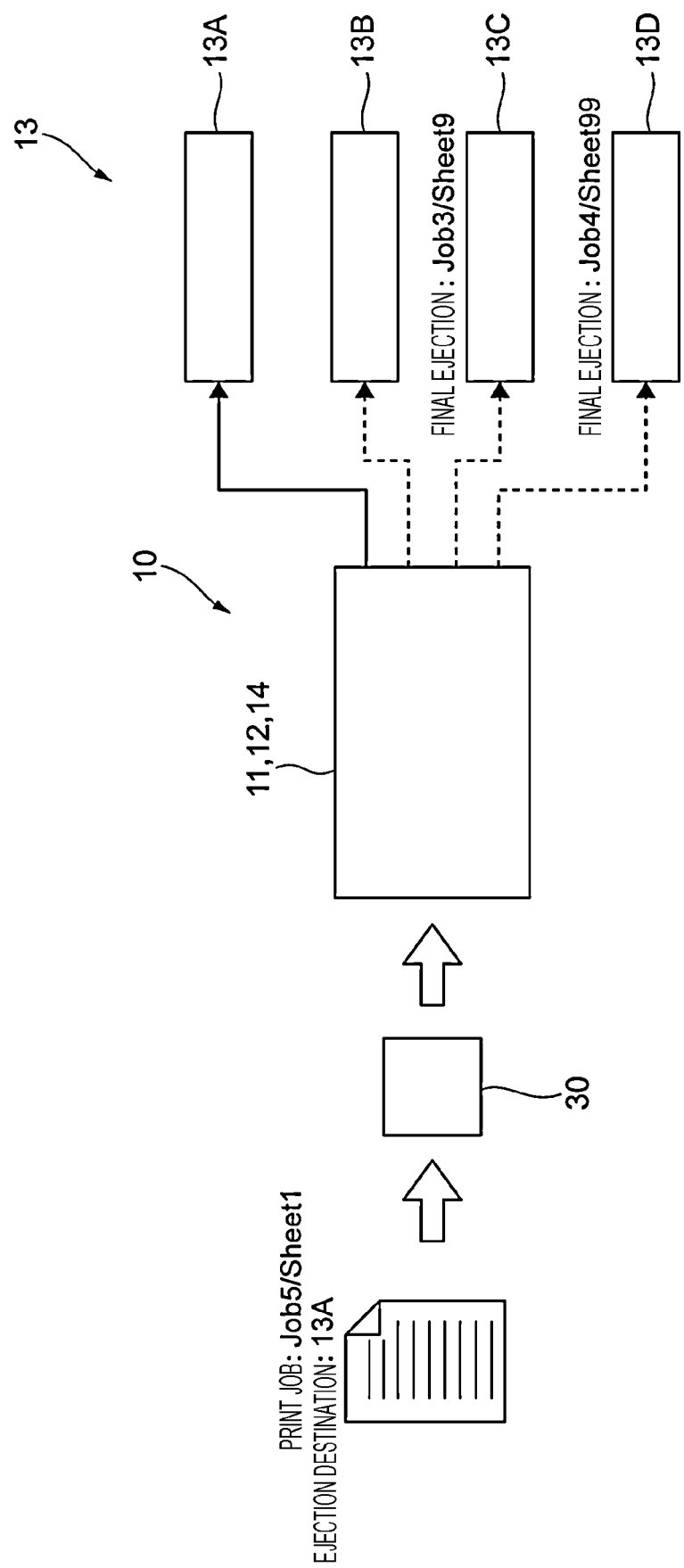
FIG. 5 is a diagram describing a third example as exemplary processing in the case where a page print job is received.

FIGS. 3 to 5 are diagrams describing exemplary processing in the case where a page print job is received. FIG. 3 illustrates a first example, FIG. 4 illustrates a second example, and FIG. 5 illustrates a third example.

First Example

In the first example illustrated in FIG. 3, the stacker tray 13A, finisher tray 13B, finisher ejection tray 13C, and ejection tray 13D of the printer 10 are all associated with a page print job. As described here, the printer 10 currently has no ejection destination to be associated with a page print job.

Specifically, the stacker tray 13A is associated with a job 1 of a page print job that has been already received, and is in a state where a printed recording medium has been ejected up to sheet 5 (fifth sheet). In addition, the finisher tray 13B is associated with a job 2, and is in a state where a printed recording medium has been ejected up to sheet 7. Furthermore, the finisher ejection tray 13C is associated with a job 3, and is in a state where a printed recording medium has been ejected up to sheet 9. The ejection tray 13D is associated with a job 4, and is in a state where a printed recording medium has been ejected up to sheet 99.

These trays 13A to 13D are all in a state where not all the pieces of a recording medium to be printed in response to their respective jobs are ejected, and are waiting for ejection of a recording medium subsequent to the already ejected recording medium.

As illustrated in FIG. 3, the first example is the case where the controller 30 has received a page print job of the job 3, and the job 3 is already associated with the finisher ejection tray 13C.

The page print job of the job 3 is for printing sheet 10 and is for a recording medium subsequent to a recording medium including sheets 1 to 9 already ejected to the finisher ejection tray 13C.

Therefore, the print controller 32 (see FIG. 2) of the controller 30 permits execution of the received page print job, and, as a result, the printing unit 12 executes the page print job to eject sheet 10 which is a printed recording medium to the finisher ejection tray 13C. Accordingly, the page identification information of the tray 13C is updated.

The job 3 in the first example illustrated in FIG. 3 is an example of a print instruction for a subsequent recording medium.

Although the first example is an example where the received page print job is the job 3 associated with the tray 13C, and execution of printing of sheet 10 which is the subsequent recording medium is permitted, if, in the association state illustrated in FIG. 3, the received page print job is the job 1 associated with the tray 13A and is for sheet 6 which is the subsequent recording medium, execution of printing is also permitted.

In addition, execution of printing is also permitted in the case where the received page print job is the job 2 associated with the tray 13B and is for sheet 8 which is the subsequent recording medium, or in the case where the received page print job is the job 4 associated with the tray 13D and is for sheet 100 which is the subsequent recording medium.

Second Example

As illustrated in FIG. 4, because the association state of the printer 10 in the second example is the same as that in the first example, a description thereof is omitted.

The second example illustrated in FIG. 4 is the case where the controller 30 has received the page print job of the job 3, like the first example described above. However, the page print job of the job 3 is for printing sheet 11, and is not for a recording medium subsequent to a recording medium including sheets 1 to 9 already ejected to the finisher ejection tray 13C.

Therefore, the print controller 32 (see FIG. 2) of the controller 30 restricts execution of the received page print job, and, as a result, the printing unit 12 does not execute the page print job. Accordingly, the order of ejection of the printed pieces of a recording medium of the job 3 in the finisher ejection tray 13C may be maintained.

The job 3 in the second example illustrated in FIG. 4 is an example of a print instruction where a recording medium other than a subsequent recording medium is ejected to a corresponding ejection destination.

Third Example

As illustrated in FIG. 5, in the third example, the association state of the printer 10 is partially different from the first and second examples described above, and the stacker tray 13A and the finisher tray 13B are not associated with a page print job. Since the finisher ejection tray 13C and the ejection tray 13D are the same as those in the first and second examples described above, descriptions thereof are omitted.

As mentioned above, the third example illustrated in FIG. 5 is in a state where the trays 13A and 13B among the trays 13A to 13D are not associated with a print job, and not all the pieces of a recording medium to be printed in response to the respective jobs are ejected to the trays 13C and 13D. In such a state, when the print job receiving unit 31 (see FIG. 2) of the controller 30 receives a print job of a new job 5, it is recognized from the print job that the ejection destination of the job 5 is the tray 13A, and the job 5 is for printing sheet 1.

The ejection controller 33 (see FIG. 2) confirms that the job 5 is associated with none of the trays 13A to 13D and that the trays 13A and 13B are not associated with a print job, and associates the above-mentioned print job identification information of the job 5 with the tray 13A. The print controller 32 (see FIG. 2) permits execution of the received print job. Accordingly, the printing unit 12 executes the print job, and sheet 1 which is a printed recording medium is ejected to the stacker tray 13A.

Figure 6:
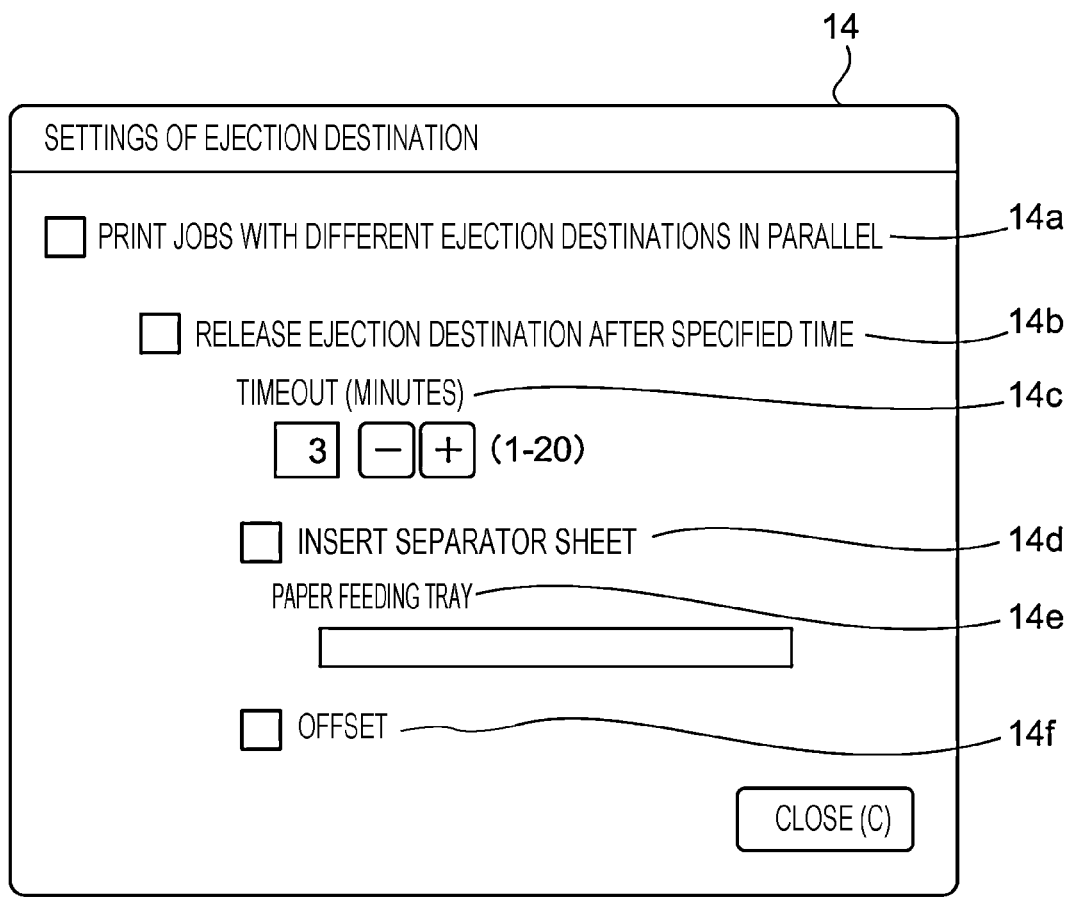
FIG. 6 is a diagram illustrating an exemplary screen for setting an ejection destination.

FIG. 6 is a diagram illustrating an exemplary screen for setting an ejection destination.

The exemplary image illustrated in FIG. 6 is a user interface (UI) screen displayed on the operation display 14 (see FIG. 1) when setting the ejection destination, and selectable items and their checkboxes are displayed. A set value set on the UI screen is reported to the ejection controller 33.

A first item 14a on the UI screen is "print jobs with different ejection destinations in parallel". By checking the checkbox of the item 14a, like the first to third examples described above, it becomes possible to receive multiple page print jobs with different ejection destinations, and perform parallel printing through ejection to any of the trays 13A to 13D. That is, the first to third examples described above are the case where this checkbox is checked.

If this checkbox is not checked, printing is performed in the order of reception of print jobs by the print job receiving unit 31.

A next item 14b on the UI screen is "release an ejection destination after a specified time".

By checking the checkbox of the item 14b, when any of the trays 13A to 13D, such as the tray 13D, continuously remains in a state where not all of 100 sheets, which is the total number of sheets, of a recording medium to be printed are ejected, the print job identification information and page identification information of the job 4 associated with the tray 13D are cleared by the ejection controller 33 (see FIG. 2). In other words, when the tray 13D continuously remains in a state waiting for ejection of a recording medium subsequent to the already ejected recording medium, the tray 13D is cleared. By this clearing process, the print job identification information and so forth of another job newly received after the tray 13D has been cleared may be associated with the tray 13D, thereby promptly making it possible to execute the new print job.

After checking this checkbox, a time indicating a timeout (minutes) may be specified within the range of one minute to twenty minutes in an item 14c. That is, how long the state of waiting continues until a timeout occurs is specified. For example, in the case where three minutes is specified as the timeout (minutes), when the elapsed time from ejection of sheet 99 of the job 4 to the tray 13D to ejection of sheet 100 exceeds three minutes, this is "continuation of the waiting state" as an example of the case where a predetermined condition is satisfied, and the above-mentioned clearing process is performed. Accordingly, the print job is aborted, thereby making it possible to execute another printing process.

The state of waiting for ejection of a subsequent recording medium in any of the trays 13A to 13D is an example of a state where a recording medium subsequent to an already ejected recording medium remains not ejected to an ejection destination, and the time specified as the timeout (minutes) is an example of a predetermined time.

If, for some reasons, a page print job for printing sheet 100 of the job 4 is not receivable from the server apparatus 20 (see FIG. 1), the job 4 is aborted to make it possible to start execution of another print job with the tray 13D as an ejection destination, thereby improving the productivity of printing.

Although the timeout is uniformly set for the trays 13A to 13D in the present exemplary embodiment, a modification where different timeouts are set for the trays 13A to 13D may be adopted.

In the case where the above-mentioned job 4 is aborted, if the print job identification information of the next job (such as a job 6) is associated with the tray 13D before a recording medium printed in response to the job 4 is removed from the tray 13D, it is necessary to make a separation between the recording medium printed in response to the job 4 (an example of a recording medium in response to a preceding print instruction) and a recording medium printed in response to the next job 6 (an example of a recording medium in response to a succeeding print instruction). Therefore, as illustrated in FIG. 6, an item 14d "insert a separator sheet", an item 14f "offset", and their checkboxes are prepared on the UI screen of the operation display 14. Below the item 14d, an item 14e "paper feeding tray" that serves as a separator sheet may be specified.

Processing performed by checking the checkbox of the item 14d "insert a separator sheet" or the item 14f "offset" is an example of processing indicating separation.

By checking the checkbox of the item 14d "insert a separator sheet", in the above example, after the job 4 for the tray 13D is aborted, a recording medium for separation is ejected. Accordingly, the recording medium for separation is positioned between the final piece of a recording medium of the job 4 and the first piece of a recording medium of the next job 6 in the tray 13D.

Such a recording medium for separation is a recording medium on which nothing is printed, and is a recording medium of the paper feeding unit 11 (see FIG. 1). Because a recording medium for separation is specifiable with the item 14e as mentioned above, it may be the same as or different from a printed recording medium. A recording medium for separation that is different from a printed recording medium may be a recording medium of a different color or with a different size.

In one example, a recording medium on which the print job identification information of one or both of the job 4 and the job 6 is printed is conceivable. In another example, a recording medium on which, along with or instead of the print job identification information, information related to each print job, such as the number of ejected sheets, is printed is also conceivable. Accordingly, the work efficiency of post-processing work on the printed recording medium may be improved.

Print job identification information is an example of information of a print instruction, and information related to a print job is an example of information related to a print instruction.

By checking the checkbox of the item 14f "offset", in the above example, after the job 4 for the tray 13D is aborted, a recording medium printed in response to the job 6 is ejected to a position shifted from the recording medium of the job 4. By shifting a recording medium of the job 4 and a recording medium of the job 6 that are ejected to the tray 13D in units of bundles, the work efficiency of post-processing work on the printed recording medium may be improved.

Figure 7:
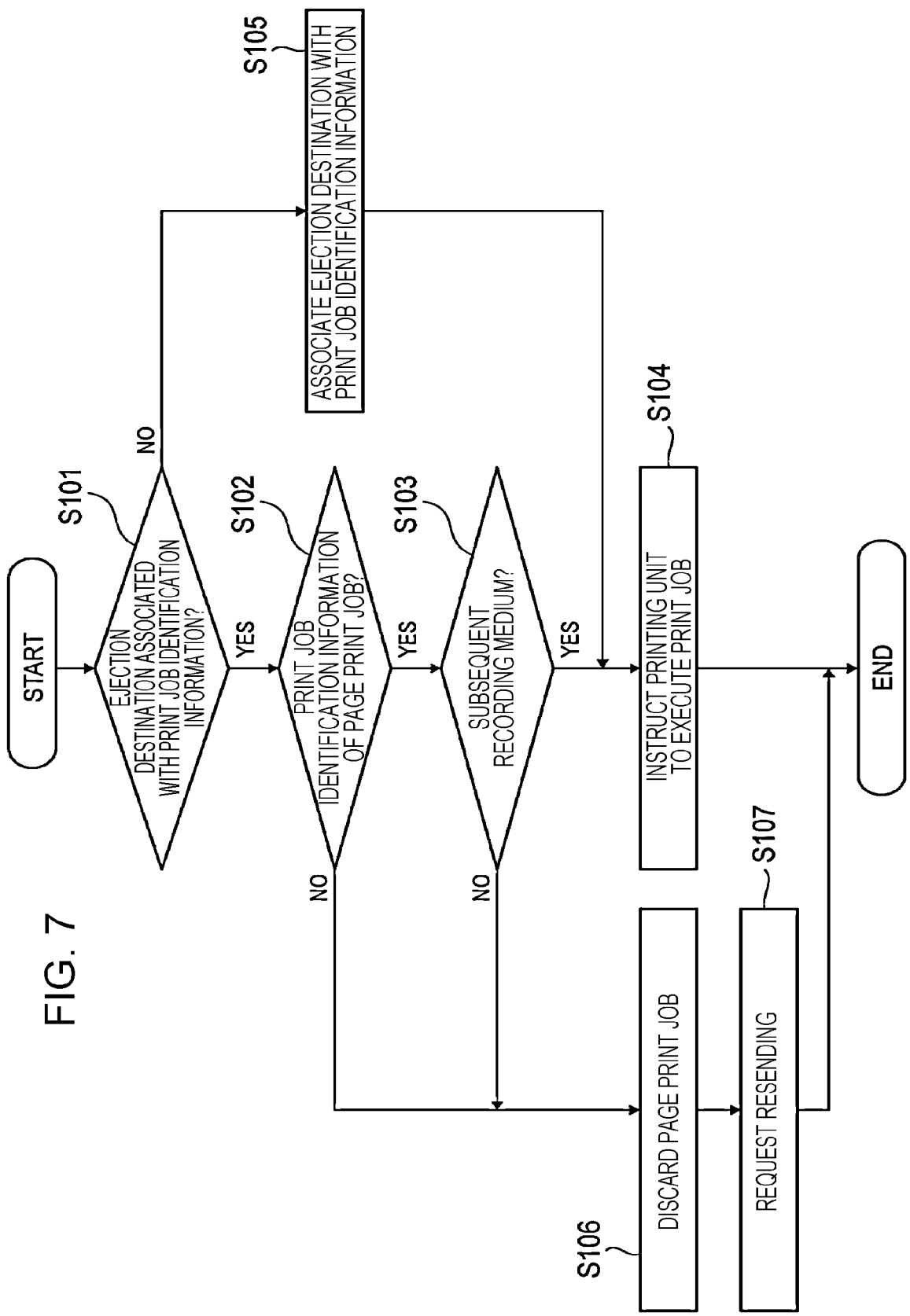
FIG. 7 is a flowchart illustrating an exemplary procedure in the case where a controller receives a page print job.

FIG. 7 is a flowchart illustrating an exemplary procedure in the case where the controller 30 receives a page print job.

As described above, when the print job receiving unit 31 (see FIG. 2) receives a print job, a page print job is reported to the print controller 32 (see FIG. 2). After checking the print job identification information and ejection destination corresponding to the page print job, the print controller 32 reports the checked print job identification information and ejection destination to the ejection controller 33 (see FIG. 2), which in turn determines whether ejection is possible.

As illustrated in FIG. 7, the ejection controller 33 (see FIG. 2) determines whether print job identification information is associated with the ejection destination of the page print job (S101).

In the case where any print job identification information is associated with the ejection destination (YES in S101), the ejection destination is a tray waiting for ejection of a subsequent recording medium, and the print job identification information is further checked. That is, it is determined whether the associated print job identification information is the print job identification information of the page print job (S102).

In the case where the associated print job identification information is the print job identification information of the current page print job (YES in S102), it is determined whether the page print job is a print job for a recording medium subsequent to the already ejected recording medium (S103). In the case where the page print job is a print job for the subsequent recording medium (YES In S103), the ejection controller 33 (see FIG. 2) reports to the print controller 32 that, as the result of determining whether ejection is possible, ejection of the recording medium to the ejection destination is possible. Accordingly, the print controller 32 instructs the printing unit 12 (FIG. 1) to execute the print job (S104).

In the case where no print job identification information is associated with the ejection destination (NO in S101), that ejection destination is in a cleared state. Therefore, the ejection controller 33 (see FIG. 2) confirms that the page print job is for printing the first piece of a recording medium, and associates the print job identification information of the current page print job with the ejection destination (S105). After that, the print controller 32 is reported that ejection of the recording medium to the ejection destination is possible. Accordingly, the print controller 32 instructs the printing unit 12 to execute the print job (S104).

In the case where print job identification information associated with the ejection destination is not the print job identification information of the current page print job (NO in S102), or in the case where the current page print job is not a print job for the subsequent recording medium (NO in S103), it is determined that this time the current page print job is not to be executed, and the print controller 32 discards the current page print job (S106). That is, the current page print job is deleted. The server apparatus 20 is requested to resend a page print job (S107), and, upon receipt of the resent page print job, it is newly determined whether it is time to execute the page print job.

In the exemplary procedure illustrated in FIG. 7, when the current page print job is not to be executed, processing is performed to discard the current page print job. However, this is not the only possible procedure. When the print system 100 includes the printer 10 provided with the storage device 34 (see FIG. 2), the not-to-be-executed current page print job may be saved in the storage device 34, and the saved print job's turn may be awaited. When its turn comes, the page print job is read from the storage device 34 and sent to the printer 10.

Figure 8:
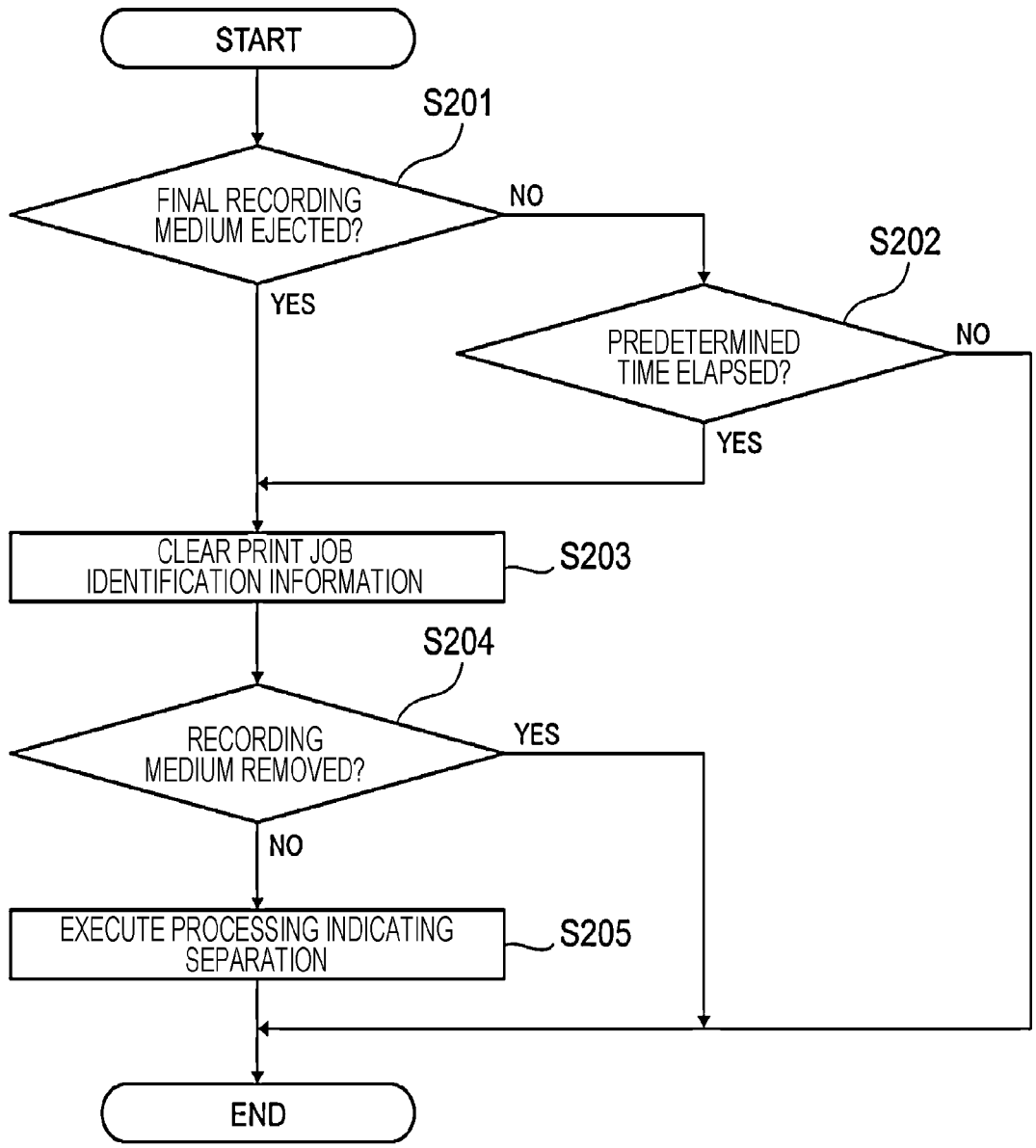
FIG. 8 is a flowchart illustrating an exemplary procedure of clearing print job identification information.
Figure 9:
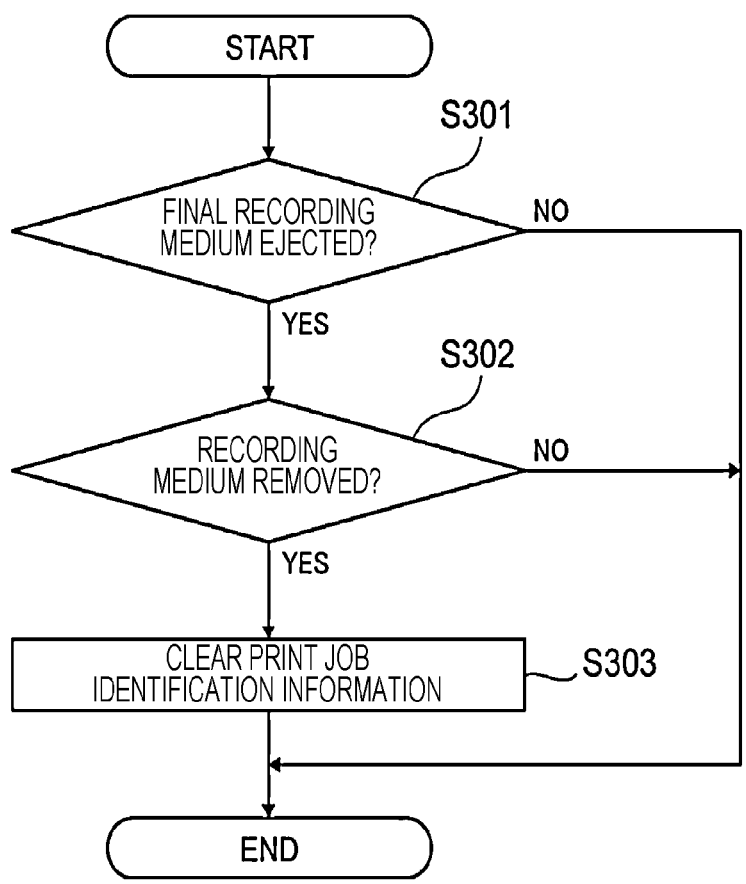
FIG. 9 is a flowchart illustrating another exemplary procedure of clearing print job identification information.

Here, the case where the ejection controller 33 (see FIG. 2) clears print job identification information is described using FIGS. 8 and 9. By performing the clearing process, an ejection destination may be associated with different print job identification information.

FIG. 8 is a flowchart illustrating an exemplary procedure of clearing print job identification information.

In the exemplary procedure illustrated in FIG. 8, it is determined whether a recording medium ejected to any ejection destination among the trays 13A to 13D is the final piece of a recording medium. That is, it is determined whether the final piece of a recording medium has been ejected (S201). In the case where the final piece of a recording medium has not been ejected (NO in S201), it is determined whether a predetermined time has elapsed (S202). The predetermined time is a value set by the item 14c (see FIG. 6) on the UI screen mentioned above.

The final piece of a recording medium mentioned here refers to a recording medium on which the final page of a print job is printed. In response to ejection of the final piece of a recording medium, it means that the recording medium in response to the print job has been entirely ejected.

In the case where the final piece of a recording medium has been ejected to the ejection destination (YES in S201), or in the case where the predetermined time has elapsed (YES in S202), clearing of print job identification information corresponding to the ejection destination is executed (S203).

It is then determined whether the printed recording medium has been removed by the user from the cleared ejection destination (S204). This detection is performed by a detector (not illustrated) provided in each of the trays 13A to 13D.

In the case where the printed recording medium has not been removed (NO in S204), processing indicating separation is executed (S205). The contents of processing indicating separation include those selected with the items 14d, 14e, and 14f (see FIG. 6) on the above-mentioned UI screen.

In the case where the predetermined time has not elapsed (NO in S202), or in the case where the printed recording medium has been removed (YES in S204), the process ends.

In this manner, by performing the clearing process regardless of the removal of the printed recording medium after the print job has ended or aborted, the time at which different print job identification information is associated with the cleared ejection destination may be made earlier, thereby improving the productivity. If the printed recording medium is not removed after the clearing process, processing indicating separation is performed, thereby enabling removal of the bundle of pieces of a recording medium for each print job from the ejection destination, which may improve the usability.

The case where the final piece of a recording medium has been ejected (see YES in S201) or the case where the predetermined time has elapsed (see YES in S202) is an example of the case where a predetermined condition is satisfied.

FIG. 9 is a flowchart illustrating another exemplary procedure of clearing print job identification information. In FIG. 9, descriptions of processing common to that in FIG. 8 are omitted.

In the exemplary procedure illustrated in FIG. 9, in the case where the final piece of a recording medium has been ejected (YES in S301) and the recording medium has been removed (YES in S302), the print job identification information is cleared (S303). Therefore, in FIG. 9, it is unnecessary to perform the processing indicating separation, which is included in the exemplary procedure illustrated in FIG. 8, and the exemplary procedure illustrated in FIG. 9 is also applicable to a printer 10 incapable of performing the processing indicating separation.

In the exemplary processing illustrated in FIG. 9, in the case where the final piece of a recording medium has been ejected and the recording medium has been removed, the clearing process is performed to enable association of different print job identification information. However, this is not the only possible procedure. In the case where the final piece of a recording medium has been ejected, the clearing process may be performed even when the recording medium has not been removed.

The case where the final piece of a recording medium has been ejected and the recording medium has been removed is an example of the case where a predetermined condition is satisfied.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing apparatus comprising:
a processor configured to:
receive a print instruction to print an image rasterized by another information processing apparatus;
associate the print instruction with any one of a plurality of ejection destinations to which a recording medium printed in response to the print instruction is ejected; and
in a case where the ejection destination associated with the print instruction waits for ejection of a recording medium subsequent to the already ejected recording medium, execute a print instruction for printing the subsequent recording medium, and not execute a print instruction for printing a recording medium other than the subsequent recording medium.

2. The information processing apparatus according to claim 1, wherein, in a case where a predetermined condition is satisfied, the ejection destination associated with the print instruction becomes capable of being associated with a print instruction different from the print instruction.

3. The information processing apparatus according to claim 2, wherein the case where the predetermined condition is satisfied includes a case where a final piece of a recording medium has been ejected to the ejection destination.

4. The information processing apparatus according to claim 2, wherein the case where the predetermined condition is satisfied includes a case where a final piece of a recording medium has been ejected to the ejection destination and the recording medium has been removed from the ejection destination.

5. The information processing apparatus according to claim 2, wherein the case where the predetermined condition is satisfied includes a case where a predetermined time has elapsed while a recording medium subsequent to the already ejected recording medium remains not ejected to the ejection destination.

6. The information processing apparatus according to claim 1, wherein:
after the associated ejection destination becomes capable of being associated with a print instruction different from the print instruction by satisfying a predetermined condition, before a recording medium is removed from the ejection destination, in a case where the different print instruction is associated with the ejection destination,
the processor is configured to perform processing indicating separation between a recording medium in response to a preceding print instruction and a recording medium in response to a succeeding print instruction.

7. The information processing apparatus according to claim 6, wherein the processing indicating separation is ejecting a recording medium for separation positioned between a final piece of a recording medium in response to the preceding print instruction and a first piece of a recording medium in response to the succeeding print instruction.

8. The information processing apparatus according to claim 7, wherein information of the print instruction and/or information related to the print instruction is printed on the recording medium for separation.

9. The information processing apparatus according to claim 6, wherein the processing indicating separation is ejecting the recording medium in response to the succeeding print instruction to a position shifted from the recording medium in response to the preceding print instruction.

10. The information processing apparatus according to claim 1, wherein, on receipt of a print instruction different from the print instruction associated with the ejection destination, the processor is configured to discard the different print instruction, and request the another information processing apparatus to resend the different print instruction.

11. The information processing apparatus according to claim 1, wherein, on receipt of a print instruction different from the print instruction associated with the ejection destination, the processor is configured to store the different print instruction in an external storage device, and read the different print instruction from the external storage device at an executable time.

12. A print system configured to:
receive a print instruction to print an image rasterized by another apparatus;
associate the print instruction with any one of a plurality of ejection destinations to which a recording medium printed in response to the print instruction is ejected; and
in a case where the ejection destination associated with the print instruction waits for ejection of a recording medium subsequent to the already ejected recording medium, execute a print instruction for printing the subsequent recording medium, and not execute a print instruction for printing a recording medium other than the subsequent recording medium.

13. A non-transitory computer readable medium storing a program causing an information processing apparatus to execute a process comprising:
receiving a print instruction to print an image rasterized by another information processing apparatus;
associating the print instruction with any one of a plurality of ejection destinations to which a recording medium printed in response to the print instruction is ejected; and
in a case where the ejection destination associated with the print instruction waits for ejection of a recording medium subsequent to the already ejected recording medium, executing a print instruction for printing the subsequent recording medium, and not executing a print instruction for printing a recording medium other than the subsequent recording medium.

* * * * *